United States Patent [19]
Van Deventer et al.

[11] 3,820,383
[45] June 28, 1974

[54] GLOVE INSPECTION APPARATUS

[75] Inventors: Arthur J. Van Deventer, Madison, Conn.; David R. Poland, Fayette, Ala.

[73] Assignee: Dart Industries Inc., Los Angeles, Calif.

[22] Filed: June 4, 1973

[21] Appl. No.: 366,905

[52] U.S. Cl. .................................................. 73/41
[51] Int. Cl. ............................................ G01m 3/36
[58] Field of Search ......... 73/37, 40, 41, 41.2, 41.3, 73/41.4, 45, 45.1, 45.2, 45.3, 45.4, 45.5

[56] References Cited
UNITED STATES PATENTS

| | | | |
|---|---|---|---|
| 2,293,290 | 8/1942 | Gammeter | 73/45.1 |
| 2,696,732 | 12/1954 | Brant et al. | 73/37 |
| 2,988,913 | 6/1961 | D'amico | 73/37 |
| 3,462,996 | 8/1969 | Frank | 73/49.2 |

*Primary Examiner*—S. Clement Swisher

[57] ABSTRACT

An automatic latex or rubber glove inspection apparatus wherein the articles to be inspected are automatically inflated subsequent to being mounted on an extended conveying mechanism. Such conveying mechanism being further arranged to traverse a distance that will allow the deflation of defective gloves enabling the selective automative removal and segregation of quality product.

8 Claims, 11 Drawing Figures

GLOVE INSPECTION APPARATUS

This invention relates to a latex, rubber or similarly structured glove inspection apparatus and more particularly to an automated inspection system. Furthermore, the premise upon which the system referred to operates assumes that grossly defective products of this type will have been inadequately formed leaving voids or openings therein. Accordingly, the gloves are initially placed on an extended conveying mechanism and inflated to a predetermined degree. During a traversal of the conveying mechanism over its course of travel, such defects will become apparent by a substantial deflation of the defective items. These, therefore, can be easily culled from those whose integrity becomes obvious by their retention of the gaseous inflating medium.

Of particular significance to the invention are the integration therein of an automatic inflation device and stripper assembly that operate in unison as a part of the system. As implied, these units are interrelated with the conveyor movement so that each of the gloves placed thereon will (1) be appropriately inflated during its continuous movement with the conveyor and (2) quality product will be stripped from it after the conveyor has made virtually a complete traversal of its path of travel.

The system furthermore contemplates the continuing necessity for a visual product inspection. Thus, a lighted viewing area is provided in the stripping area. Thus, at the same time grossly defective product are removed from the conveyor, those that have retained the inflating mediums and appear satisfactory may be visually inspected. To assist in this phase of the inspection, it is advisable that the inflated gloves be rotated as they pass this area. Accordingly, the glove chuck assemblies are rotatably mounted on the conveyor and further include an integral sprocket that is adapted to engage a chain rack as it passes through this designated area.

Prior art techniques have for the most part relied upon individual article inspection including the inflation thereof. These have, however, been short term inflations wherein each inspector first inflated the glove and then held the inflated article close to his or her face in an effort to sense the presence of any leaks therein. As should be readily apparent such technique was less than fully satisfactory when attempting to locate very small defects. Furthermore, since 100% inspection is deemed necessary in this field, the practice previously followed meant that a substantial staff of qualified inspectors had to be trained and maintained.

Accordingly, mechanization of the inspection technique lends itself to a two-fold advantage in that staff requirements are minimized and the process for inspection is far more reliably carried out.

Summarizing, therefore, the objectives of invention are to provide an automated system for glove inspection that includes a mechanised glove stripper and an automatic inflation device adapted to pressurize the flexible gloves appropriately for the detection of voids therein.

These and additional objects and advantages of this invention will become more apparent upon reference to the following description, claims and appended drawings wherein:

Figure 1:
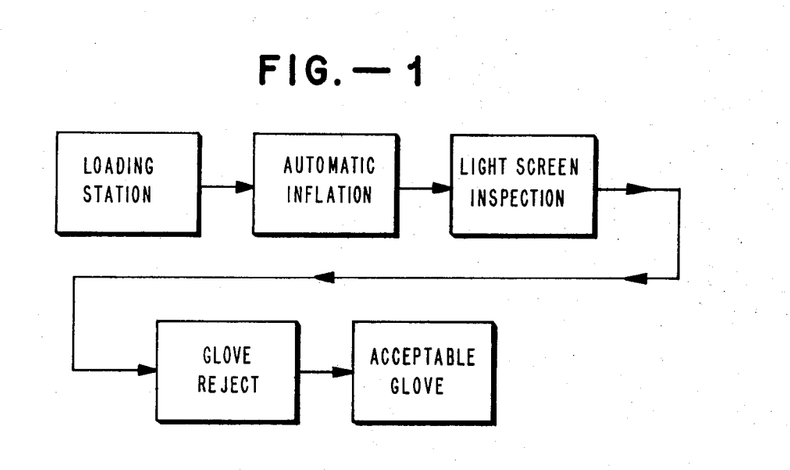
FIG. 1 is a block diagram illustrating the method and mode of operation contemplated by the invention.
Figures 2, 4:
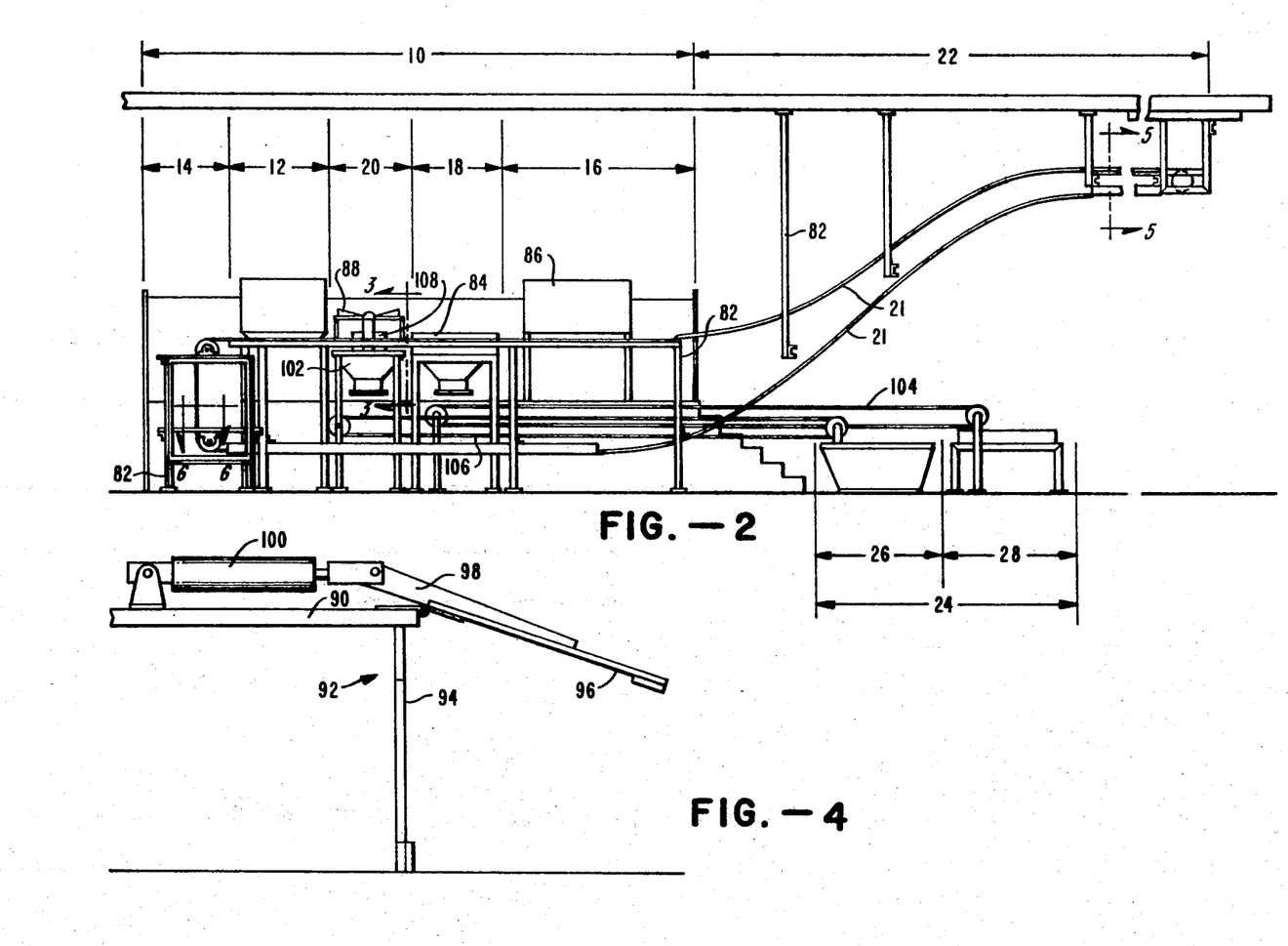
FIG. 2 is an elevational side view schematically diagramming the inspection apparatus of the invention and in particular showing the arrangement of the various component parts thereof.
FIG. 4 is an enlarged view illustrating the gripper elements of the glove stripper.

With continuing reference to the accompanying drawings wherein like reference numerals designate similar parts throughout the various figures, and with initial attention to FIGS. 1 and 2, the area encompassed by reference numberal 10 is the operations area and includes an article, i.e., glove loading station 12, an article inflation area 14, a light screen (shadow box) inspection station 16, a defective glove removal area 18 and the acceptable glove removal or stripper area 20. As is apparent from FIG. 2, a conveyor mechanism 21 passes through the operations area 10 and extends substantially beyond that area into what may be referred to as static area 22, more fully discussed hereinbelow. The apparatus and system is completed by a glove collection area 24 that includes a defective glove collection means, a receptacle 26 and an acceptable glove collection means or conveyor area 28.

Figure 5:
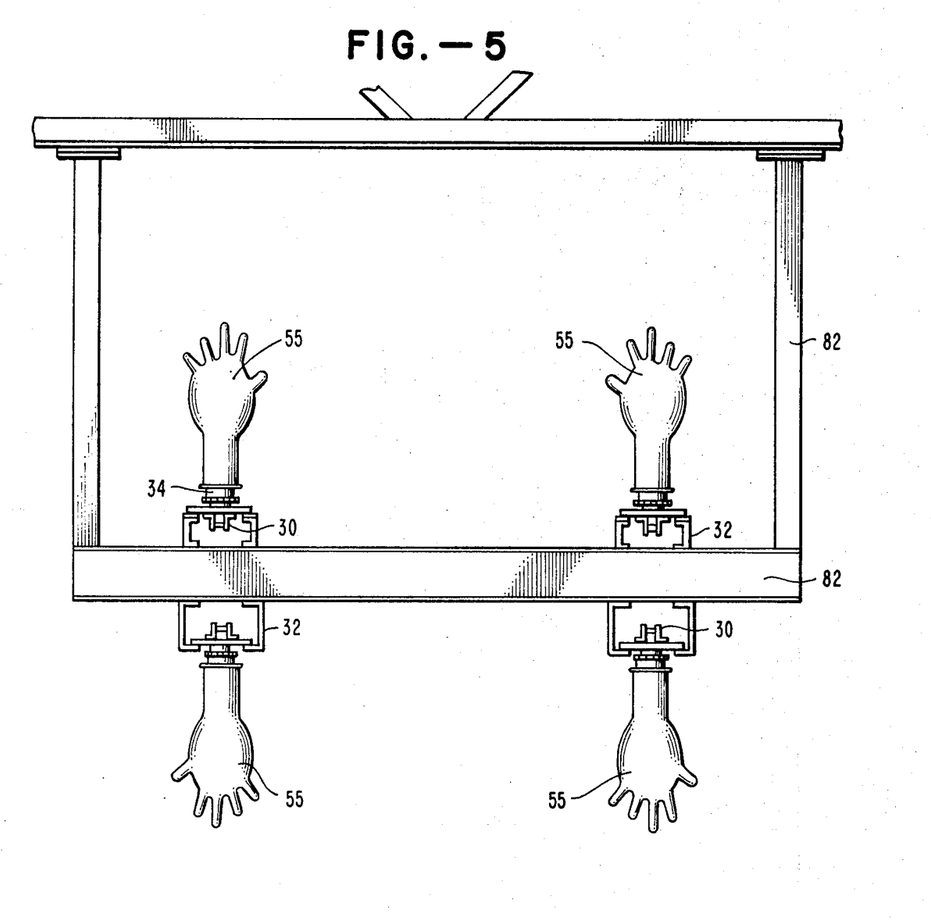
FIG. 5 is a partial cross sectional view of the inspection conveyor taken along line 5—5 of FIG. 2.

The conveyor mechanism 21 is preferably a continously moving arrangement comprised of a chain link 30 construction (FIGS. 5 and 6) which traverses a course of travel through areas 10 and 22 as is defined by a guide rail arrangement such as is depicted at 32.

Although the extent of the conveyor mechanism and its speed of travel through the course layout may vary according to conditions, it has been found that approximately a 15 minute traversal after inflation is sufficient to reveal even the most obscure of the leakers.

Note also that the indicated conveyor mechanism is shown to be a dual line system, however, it should be appreciated that any appropriate number of lines might be employed without departing from concepts disclosed herein. It should also be apparent that continuously moving conveyor mechanism 21 must necessarily be driven by some suitable power source (not shown). Furthermore, a plurality of driving inputs to the conveyor may be used where and when appropriate.

Figure 6:
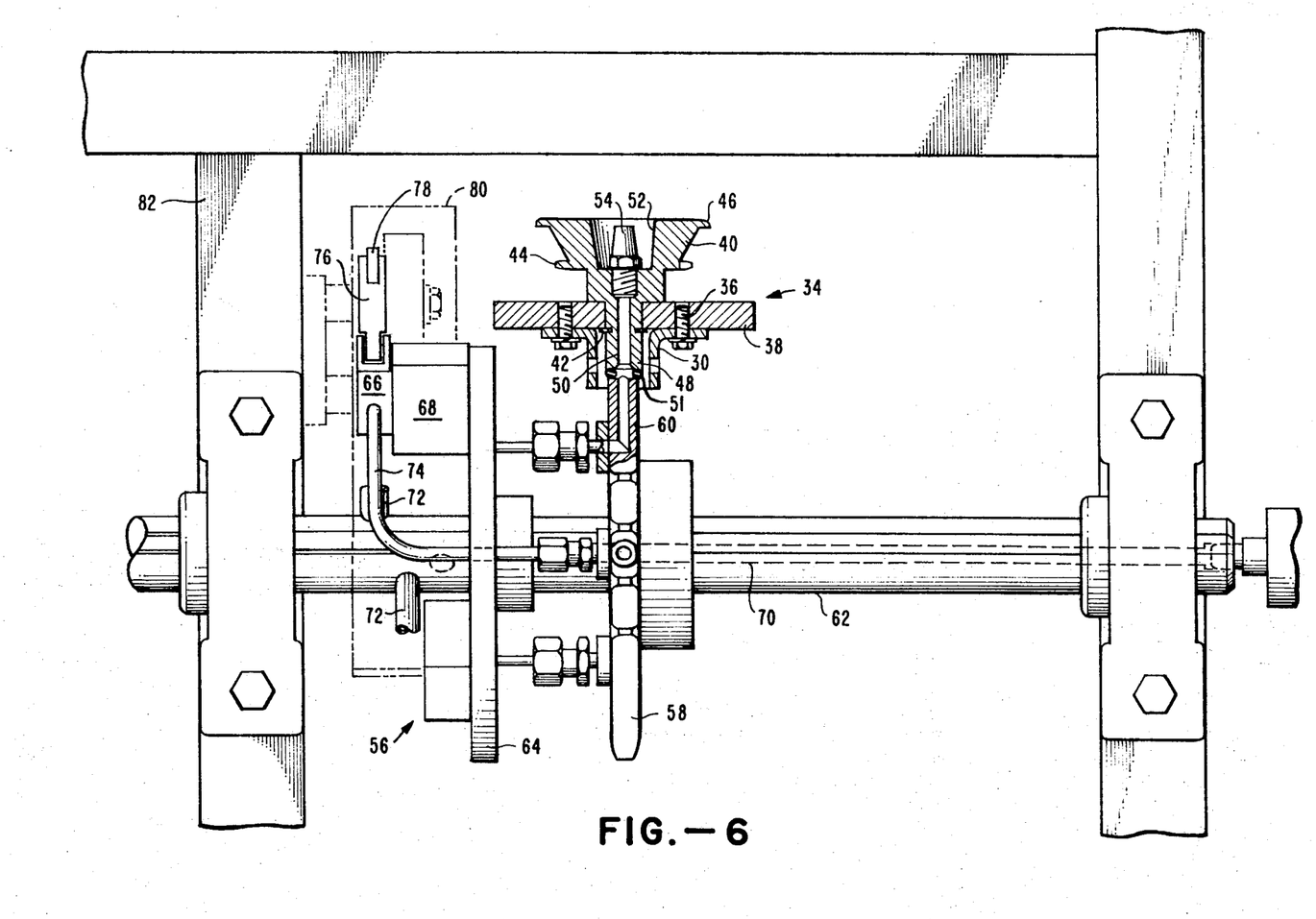
FIG. 6 is a partial top plan view, partially a cross section of the automatic inflation device taken along line 6—6 of FIG. 2 combined with a cross-sectional view of the chuck assembly as taken along line 6A—6A of FIG. 8.
Figures 7, 8:
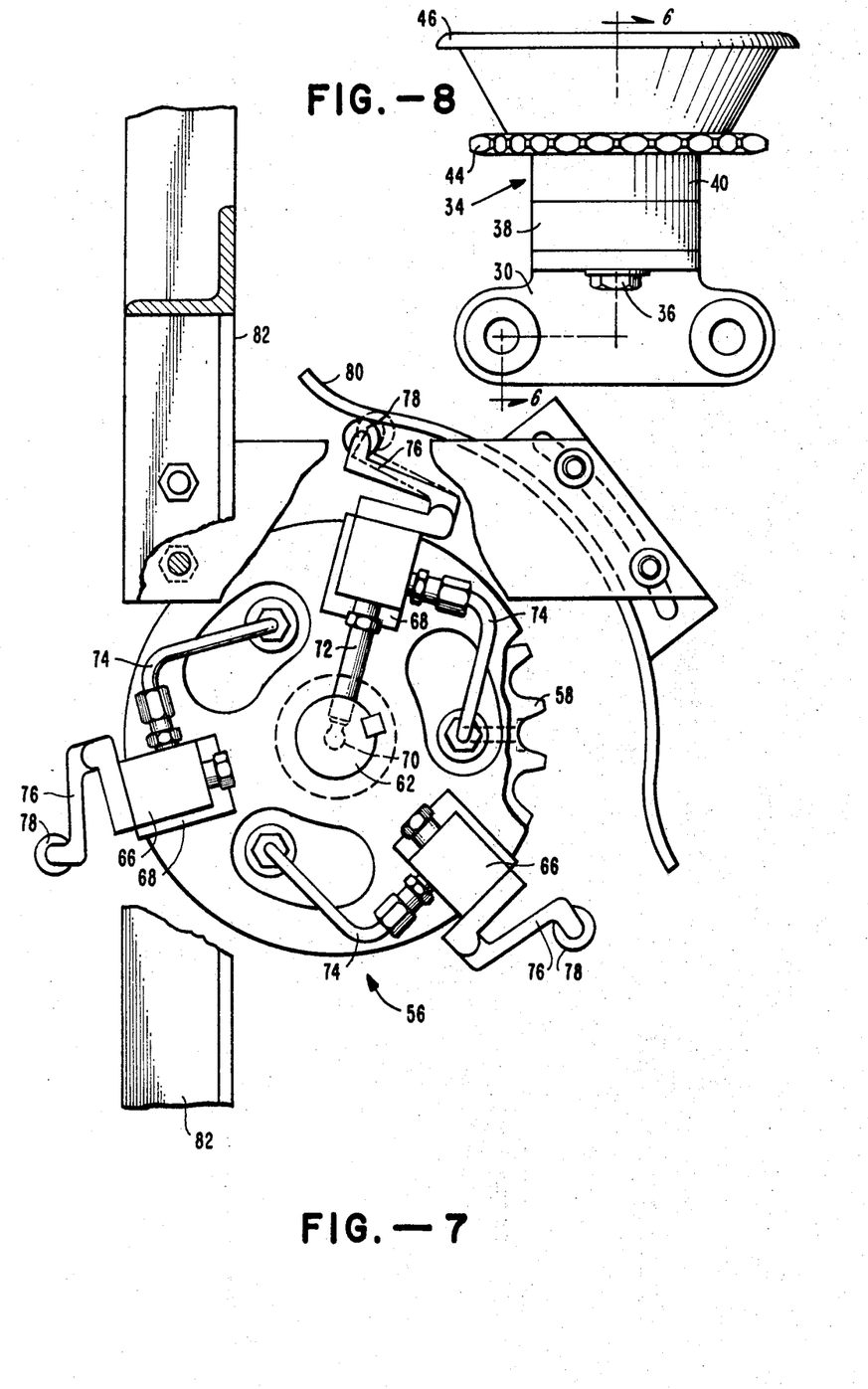
FIG. 7 is an end view of the inflation device partially broken away for clarity.
FIG. 8 is a side elevational view of a glove chuck and a link from the conveying mechanism.

A plurality of chuck assemblies 34 are spaced along the chain link construction 30 and are rigidly affixed thereto by suitable holding means, for example, stud bolts 36. Such assemblies each include a bearing block member 38 to which the chain link is affixed and a chuck or mounting member 40 which is rotatably mounted to member 38 by means of a retainer ring 42. Mounting member 38, as is apparent in FIGS. 6 and 8, is integrally formed and includes sprocket 44, an undercut lip 46 and projecting portion 48 all of which are more fully discussed hereinbelow. The mounting member also has a conduit 50 extending through projecting portion 48 and and into a counter bore 52 in the main body area of the member. Such counterbore 52 is of a size and shape that will accommodate a one-way or check valve 54 at the terminal end of the conduit 50.

The cuff areas of gloves 55 are stretched over the mentioned lip 46 on mounting member 40 and are sealed thereagainst. Such loading of the apparatus occurs in area 12 and readies the system for an inspection traversal.

An automatic inflation device 56 as may best be seen in FIGS. 6 and 7 also is of substantial significance to the success of this apparatus. It is this device acting in cooperation and synchronization with the chuck assemblies that accurately inflates the gloves prior to their traverse of the system. The cooperative effect spoken of may best be seen in FIG. 6 where the coaction of chain link 30 with the aspirated sprocket 58 is illustrated. Here also note how the alignment between conduit 50 and one of the fluid passageways 60 in sprocket 58 is effected to allow passage of the glove inflation medium to an article stretched over lip 46 on member 40. During the movement of the conveyor mechanism around sprocket 58 a seal is effected between such sprocket and projecting portion 48 by the resilient O-ring 51 that is cemented or otherwise attached to sprocke sprocket 58 around passageways 60.

Sprocket 58 is, of course, rigidly but removably keyed to shaft 62 over and around which the chain link conveyor is adapted to pass. Furthermore, a control disc 64 is similarly affixed to the same shaft for rotation therewith. This disc 64 carries the various valving means 66 which are mounted to spacer blocks 68 that are in turn securely fastened to the disc by any suitable means.

The fluid meadium for inflating the gloves finds its way to aspirated sprocket 58 from a source (not shown) through a center bore 70 in shaft 62, radially extending pipes 72, valving means 66 and tubing 74. Centerbore 70 and pipes 72 are constantly pressurized during operation of the apparatus and at preselected intervals the valving means 66 is opened by actuator 76, that includes cam follower 78. Cam 80 is adjustably mounted on machine frame 82 and the referenced follower intermittently engages same as shaft 62 rotates in response to motive force applied to the conveyor mechanism.

It should be appreciated that in the preferred embodiment at least two inflation devices, as are above described, are mounted on shaft 62, one associated with each of the dual conveyor mechanisms. Furthermore, in the event that the rate of travel of the conveyor is such that the chuck assemblies and a single inflation device are not interengaged for a time sufficient to allow for complete and adequate inflation of the gloves, tandem units may be employed, thus providing primary and subsidiary inflation areas in the system.

Subsequent to article inflation, the chuck assemblies 34 move out of contact with inflation devices 56 but deflation of the gloves is prevented by the one way valve 54. Thereafter the conveyor or mechanism traverses the system for a predetermined period of time, preferably about 15 minutes, in the static area 22 (FIG. 2). This, as is indicated above, provides a sufficient period of time for "leakers" to become readily apparent to the naked eye. Complete or even partial deflation is indicative of a defect and such glove upon arrival at and appearance in the inspection area will be discarded by an inspector who is located in that area 16. The deflated product articles are hand stripped from the chuck assemblies 34 by the inspector and deposited in the open bottomed bin 84 (FIG. 2) located in area 18. Likewise, this same inspector visually inspects the quality gloves that have retained the inflating medium. This visual review is undertaken at a lighted viewing area or shadow box 86 which illuminates the articles and thereby exposes other flaws, inclusions or the like that may have been generating during manufacture. Of course, defective product that is exposed is also hand stripped and deposited in bin 84.

During the mentioned visual inspection, the mounting member 40 of the chuck assembly 34 is rotated so that all areas of the glove supported thereby are clearly presented to the viewer (inspector) for perusal. Such rotation is effected by the engagement of sprocket 44 with a fixed chain-like rack (not shown). Thus, as the conveyor mechanism moves past area 16 and shadow box 86 the sprocket rolls along the rack.

Figure 3:
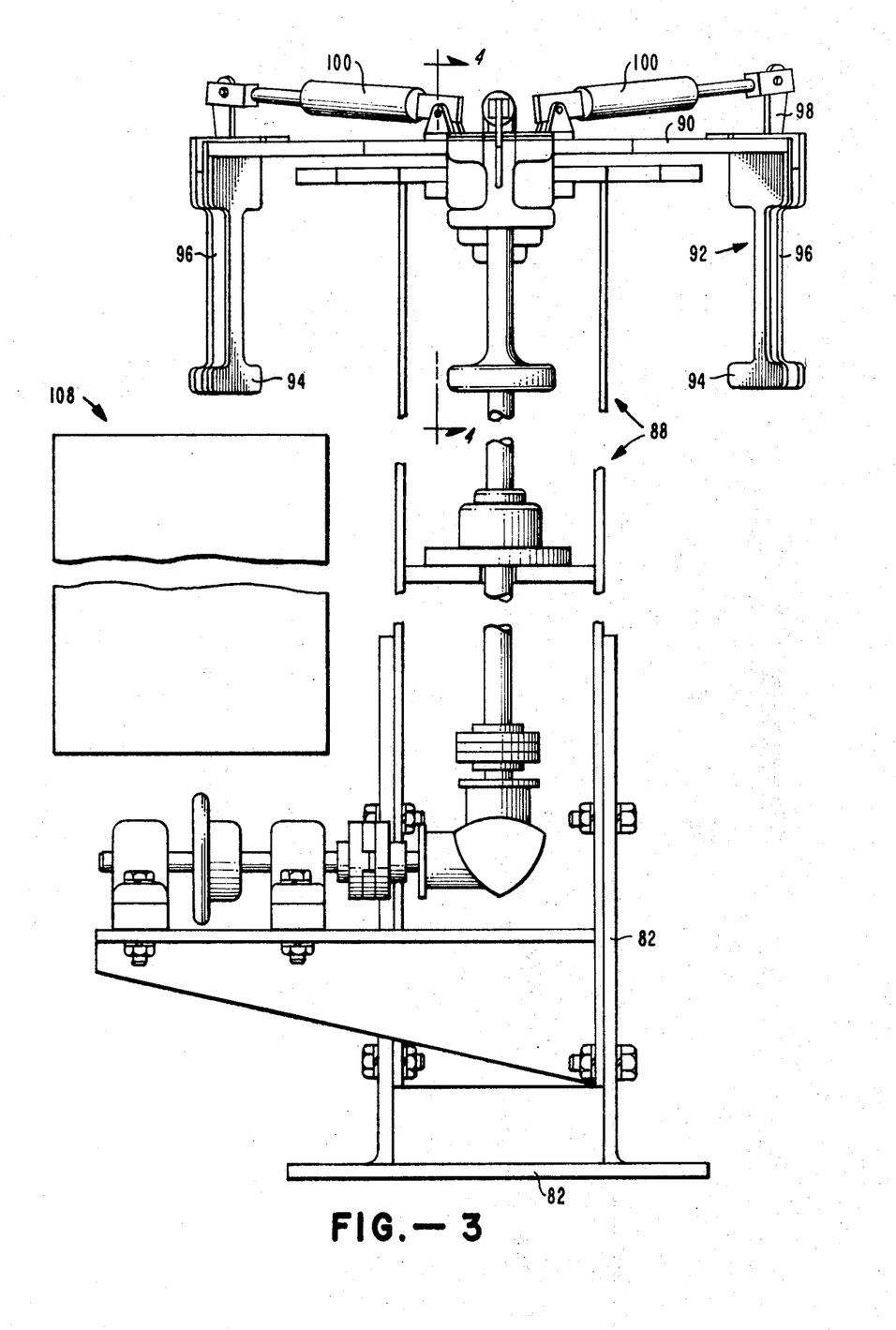
FIG. 3 is a partial front elevational view of the apparatus taken along line 3—3 of FIG. 2 showing the glove stripper arrangement.

Quality product is left undisturbed on its mounting member and proceeds therewith to the stripping area 20. Here a rotatably mounted stripper arrangement 88 (FIGS. 3 and 4) also moves in unison with the conveyor mechanism 21 so that an overhead spider is positioned above and adjacent each chuck assembly 34 as it passes this station. At each spider arm extremity there is located a gripper element 92 comprised of a fixed finger 94 and a movable hinged finger 96. As is readily apparent in FIGS. 3 and 4, hinged finger 96 is interconnected by link 98 to a fluid actuated piston-cylinder arrangement 100 for pivotal movement responsive thereto.

In operation as each chuck assembly 34 approaches area 20, arrangement 100 is fully retracted and fingers 94, 96 are wholly separated as shown in FIG. 4. As such come adjacent one another, the piston-cylinder arrangement is extended and the fingers close gripping a quality glove therebetween. Continued respective movement between these then strips a glove 55 from assembly 34 and at the proper position during the continuing rotation of stripper 88 the fingers 94, 96 again open and the glove 55 is deposited in open ended bin 102.

The synchronized operation of stripper arrangement 88 may be interconnected in a variety of ways with the conveyor driving means or may be independently driven. A single stripper 86 is used to remove gloves from each dual line which moves in parellel past same.

Figure 9:
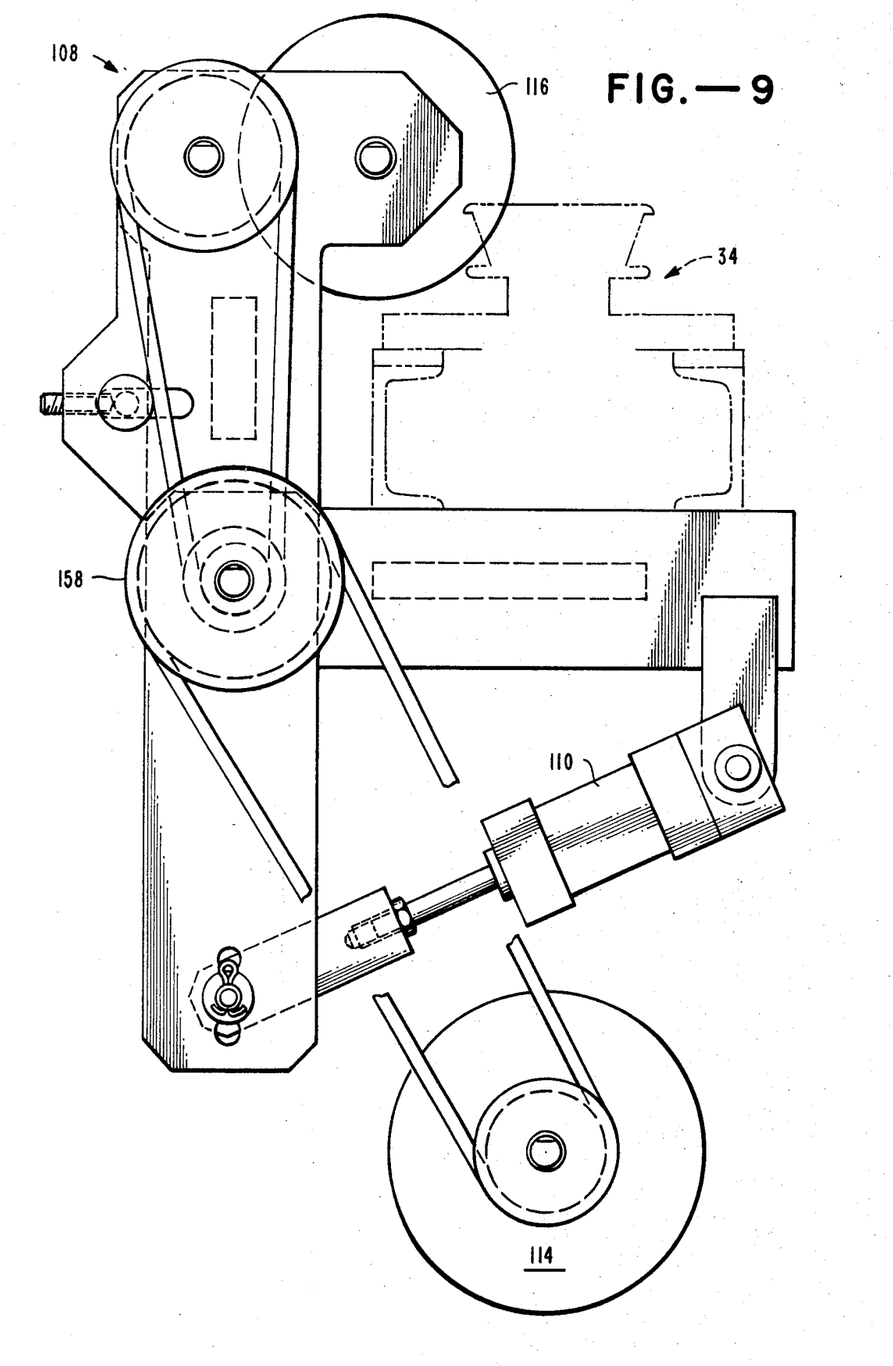
FIG. 9 is a partial side elevational view of the apparatus taken along line 3—3 of FIG. 2 showing the brush assembly that assists in stripping the glove from the inspection apparatus.
Figures 10, 11:
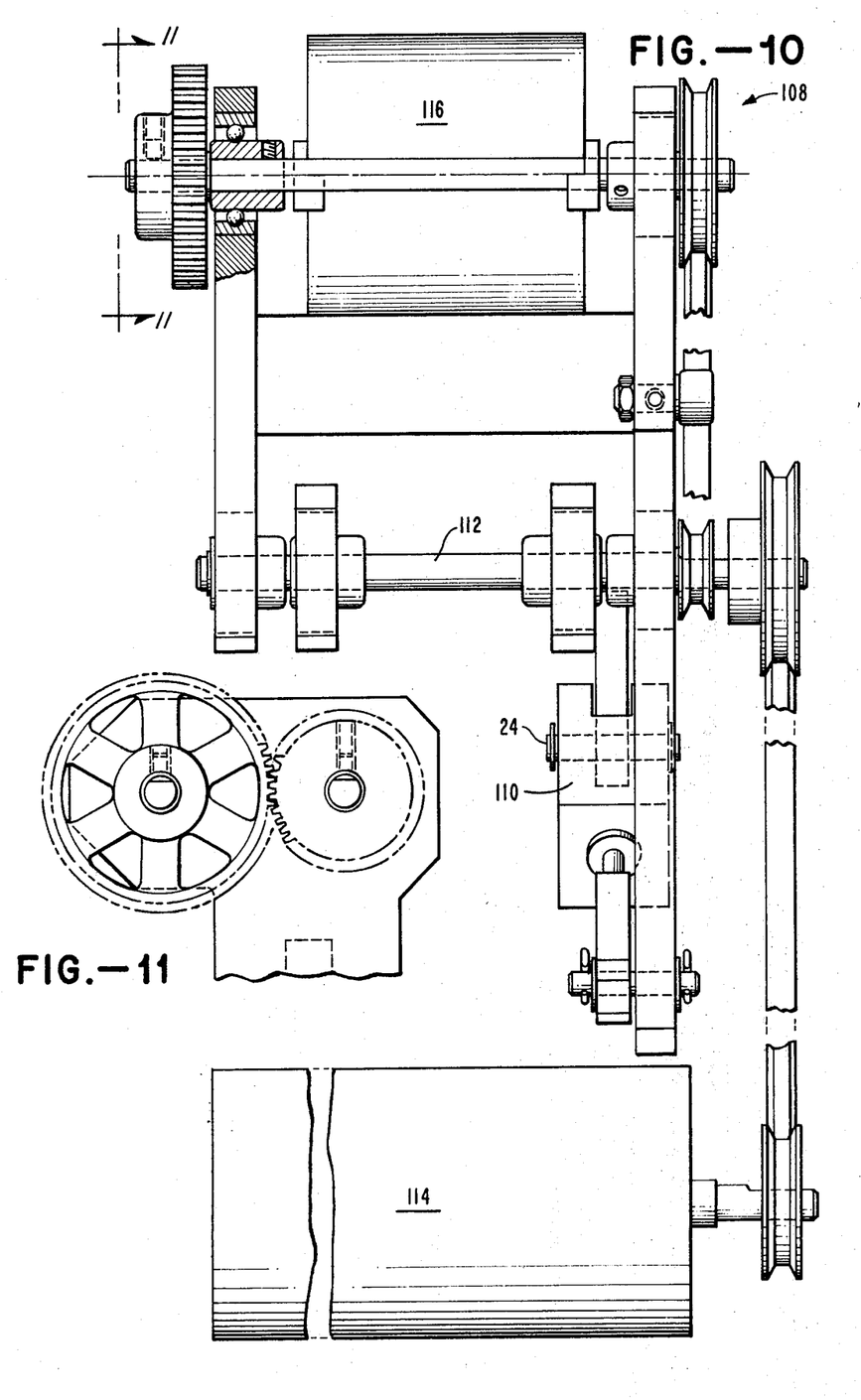
FIG. 10 is a front elevational view of the brush assembly shown in FIG. 9.
FIG. 11 is a partial side elevational view of the brush assembly taken along line 11—11 of FIG. 10.

FIGS. 9–11 illustrate the brush assembly 108 that is positioned opposite each stripper 88 to assist in the removal of gloves 55 from chucks 34. Such assemblies 108 are mounted for pivotal movement by means of fluid cylinder 110 about shaft 112 which is mounted on frame 82 into engagement with each chuck as it arrives in the stripping area 20. As is apparent the motor 114 drives brush 116 through a plurality of belts and gears (FIG. 11) that are conventional in form and arrangement.

The action of brush 116 is effective to roll the bead on gloves 55 up and over the rim 46 of the chuck assemblies 34 so that the pulling action of gripper elements 92 will not damage the gloves.

As is visible in FIG. 2 defective product is deposited from bin 84 onto conveyor 106. Each of these conveyors transport the respective gloves to collection area 24 where such are either retained in areas 26 and 28 or otherwise conveyed to a suitable storage, packaging or disposal unit.

We claim:

1. An inspection apparatus for inflatable articles and including:
   1. a conveyor mechanism having mounted thereon a plurality of chuck assemblies, each of said assemblies including a mounting member with a conduit extending therethrough and a one-way valving unit positioned in communication with said conduit;
   2. an inflation device moving in synchronization with said conveyor and positioned for intermittent abutment with said mounting member said device having a fluid passageway extending from a fluid source and which is aligned with said conduit in the mounting member upon abutment therewith, and valve means including an actuator therefor interconnected with said fluid passageway;
   3. means positioned adjacent said device for coaction with said actuator thereby opening the valve means during abutment between said member and device enabling fluid to pass from said source to an article positioned on said member; and
   4. a stripper arrangement including a plurality of gripper elements which are positioned in unison with said mechanism at points adjacent said assemblies and interact together responsive to a driving means to alternately close when in said adjacent position and open when spaced therefrom.

2. An inspection apparatus according to claim 1 wherein said mounting member positioned for rotation in a bearing block and includes sprocket means integral therewith.

3. An inspection apparatus according to claim 1 wherein said conveyor mechanism is of a chain link construction and said inflation device includes a sprocket assembly which coacts therewith.

4. An inspection apparatus according to claim 3 wherein a portion of said member extends into the chain link construction and wherein at least part of the fluid passageway is internal to said sprocket assembly and exists on the periphery thereof at a point corresponding to that of said portion.

5. An inspection apparatus according to claim 4 wherein said means is a cam member and the actuator is a cam follower.

6. An inspection apparatus according to claim 1 wherein said stripper assembly is rotatably mounted and includes an overhead spider upon which said gripper elements are affixed.

7. An inspection apparatus according to claim 6 wherein said gripper elements are pivotally affixed to said spider and said driving means include fluid cylinders that are operatively connected thereto.

8. An inspection apparatus according to claim 4 wherein a sealing member is attached to the exit of said fluid passageway for active engagement with said portion.

* * * * *